United States Patent
Gullen (10) Patent No.: US 11,082,534 B2
(45) Date of Patent: Aug. 3, 2021

(54) METHODS AND DEVICES FOR TESTING APPLICATIONS

(71) Applicant: Scirra Ltd., London (GB)

(72) Inventor: Ashley Gullen, London (GB)

(73) Assignee: Scirra Ltd., London (GB)

( * ) Notice: Subject to any disclaimer, the term of this patent is extended or adjusted under 35 U.S.C. 154(b) by 165 days.

(21) Appl. No.: 15/499,043

(22) Filed: Apr. 27, 2017

(65) Prior Publication Data

US 2018/0254970 A1 Sep. 6, 2018

(30) Foreign Application Priority Data

Mar. 3, 2017 (GB) .................................... 1703460

(51) Int. Cl.
*H04L 29/08* (2006.01)
*G06F 11/36* (2006.01)
*G06Q 10/10* (2012.01)

(52) U.S. Cl.
CPC ........... *H04L 67/36* (2013.01); *G06Q 10/101* (2013.01); *H04L 67/34* (2013.01); *G06F 11/3664* (2013.01); *H04L 67/025* (2013.01)

(58) Field of Classification Search
CPC ..... H04L 67/104; H04L 67/025; H04L 67/34; G06F 11/30
See application file for complete search history.

(56) References Cited

U.S. PATENT DOCUMENTS

| | | | | |
|---|---|---|---|---|
| 6,061,695 A * | 5/2000 | Slivka | ................... | G06F 40/137 715/203 |
| 9,349,246 B1 * | 5/2016 | Paradise | ............. | G07F 17/3225 |
| 10,893,081 B2 * | 1/2021 | Lo | ......................... | G06F 40/166 |
| 2005/0044198 A1 * | 2/2005 | Okitsu | .................. | G06F 3/0665 709/223 |
| 2005/0251500 A1 * | 11/2005 | Vahalia | ............... | G06F 16/1774 |
| 2005/0265240 A1 * | 12/2005 | Jain | ......................... | H04L 41/32 370/241 |
| 2006/0281556 A1 * | 12/2006 | Solomon | ................. | A63F 13/12 463/43 |
| 2008/0120342 A1 * | 5/2008 | Reed | ....................... | G06F 16/40 |
| 2009/0111583 A1 * | 4/2009 | Zalewski | ................ | A63F 13/12 463/42 |
| 2009/0198484 A1 * | 8/2009 | Christensen | ........ | G06F 11/3668 703/22 |
| 2009/0265391 A1 * | 10/2009 | Dai | ......................... | H04L 41/08 |
| 2011/0065503 A1 * | 3/2011 | Wolff-Petersen | ....... | A63F 13/10 463/31 |
| 2012/0047339 A1 * | 2/2012 | Decasper | ............ | G06F 11/1076 711/162 |

(Continued)

FOREIGN PATENT DOCUMENTS

WO 2016150748 A1 9/2016

OTHER PUBLICATIONS

Jul. 13, 2018—(EP) Extended Search Report—App 18159739.4.

*Primary Examiner* — Uzma Alam
(74) *Attorney, Agent, or Firm* — Banner & Witcoff, Ltd.

(57) ABSTRACT

A method of testing an application, comprising: establishing, from a host device, a peer-to-peer connection with a viewer device in a communications network; transmitting, from the host device, application project resources to the viewer device to enable testing of the application at the viewer device; and receiving, at the host device, data relating to the testing of the application.

13 Claims, 10 Drawing Sheets

(56) References Cited

U.S. PATENT DOCUMENTS

| | | | |
|---|---|---|---|
| 2012/0060143 A1* | 3/2012 | Nigul | H04L 63/102 717/103 |
| 2012/0102291 A1* | 4/2012 | Cherian | G06F 3/067 711/170 |
| 2013/0198266 A1 | 8/2013 | Kiley et al. | |
| 2013/0212373 A1* | 8/2013 | Dodgson | H04L 9/0894 713/150 |
| 2014/0095650 A1* | 4/2014 | Resch | G06F 11/073 709/213 |
| 2015/0271257 A1* | 9/2015 | Abramov | H04L 67/104 709/222 |
| 2016/0127339 A1* | 5/2016 | Childs | G06F 16/148 726/7 |
| 2016/0274890 A1* | 9/2016 | Sternfeld | G06F 8/65 |
| 2016/0315887 A1* | 10/2016 | Uraizee | H04L 63/105 |
| 2016/0321287 A1* | 11/2016 | Luthra | G06F 9/46 |
| 2016/0323381 A1* | 11/2016 | Huang | H04L 67/1097 |
| 2017/0212910 A1* | 7/2017 | Morris | G06T 7/70 |
| 2017/0251260 A1* | 8/2017 | Sanders | H04N 21/4668 |
| 2017/0302678 A1* | 10/2017 | Borlick | H04L 63/102 |
| 2017/0354878 A1* | 12/2017 | Posin | A63F 13/355 |

* cited by examiner

METHODS AND DEVICES FOR TESTING APPLICATIONS

Aspects described herein relate to methods and devices for testing applications. In particular, aspects relate to methods and devices that utilise peer-to-peer connections for testing applications.

BACKGROUND

Project sharing software provides a way for a user to share a project with a second user or group of other users. Such projects include computer executable applications such as computer aided design models, audio/video projects and computer games. A key use of project sharing software is to enable developers to share, preview, test, manipulate and edit a project during its development.

Efficient project sharing allows for beta-testing and rapid iteration cycles during the development process. For project sharing across multiple devices or teams, a key feature of project sharing software is the provision of a preview mode, which allows the project to be previewed on different devices. This requires sending project content over a network. Traditionally, project content has been shared over a local area network (LAN), a wired connection between two devices, or by hosting server infrastructure which serves multiple client connections within a traditional server-client model.

These traditional methods have severe drawbacks. Typically, these methods confine the sharing of project content to a local network. Moreover, projects such as computer games involve large amounts of data for images, audio, video and more. Hosting large amounts of data on a traditional web server incurs significant server running costs, particularly bandwidth costs.

As web browser applications (such as MICROSOFT INTERNET EXPLORER) become increasingly sophisticated, it is desirable to reproduce the ability to share projects in the context of a web browser application. However, none of the traditional project sharing methods are applicable, due to the security model of web pages. Web browser applications cannot directly access hardware (such as a cabled connection), do not have permission to host a server, and cannot directly communicate with other devices over a LAN, even if a valid IP address is known.

Therefore, there exists a need for improved systems and methods of project sharing. Additionally, there exists a need for improved systems and methods of project sharing in web browser applications.

SUMMARY

In a first aspect, a method of testing an application includes: establishing, from a host device, a peer-to-peer connection with a viewer device in a communications network; transmitting, from the host device, application project resources to the viewer device to enable testing of the application at the viewer device; and receiving, at the host device, data relating to the testing of the application.

In a second aspect, a method of testing an application includes: establishing, at a viewer device, a peer-to-peer connection with a host device; receiving, at the viewer device, application project resources from the host device; and loading, at the viewer device, the application using the application project resources to enable testing of the application at the viewer device.

In a third aspect, a host device for testing applications may be configured to: establish peer-to-peer connections with viewer devices; transmit application project resources to viewer devices in a communications network to enable testing of applications at the viewer devices; and receive data relating to the testing of applications from viewer devices.

In a fourth aspect, a viewer device for testing applications may be configured to: establish a peer-to-peer connection with a host device; receive application project resources from the host device; and load the application using the application project resources to enable testing of the application at the viewer device.

Further features are further described below and also defined in the appended claims.

BRIEF DESCRIPTION OF THE DRAWINGS

By way of example only, aspects will now be described with reference to the drawings, in which.

DETAILED DESCRIPTION

Figure 1:
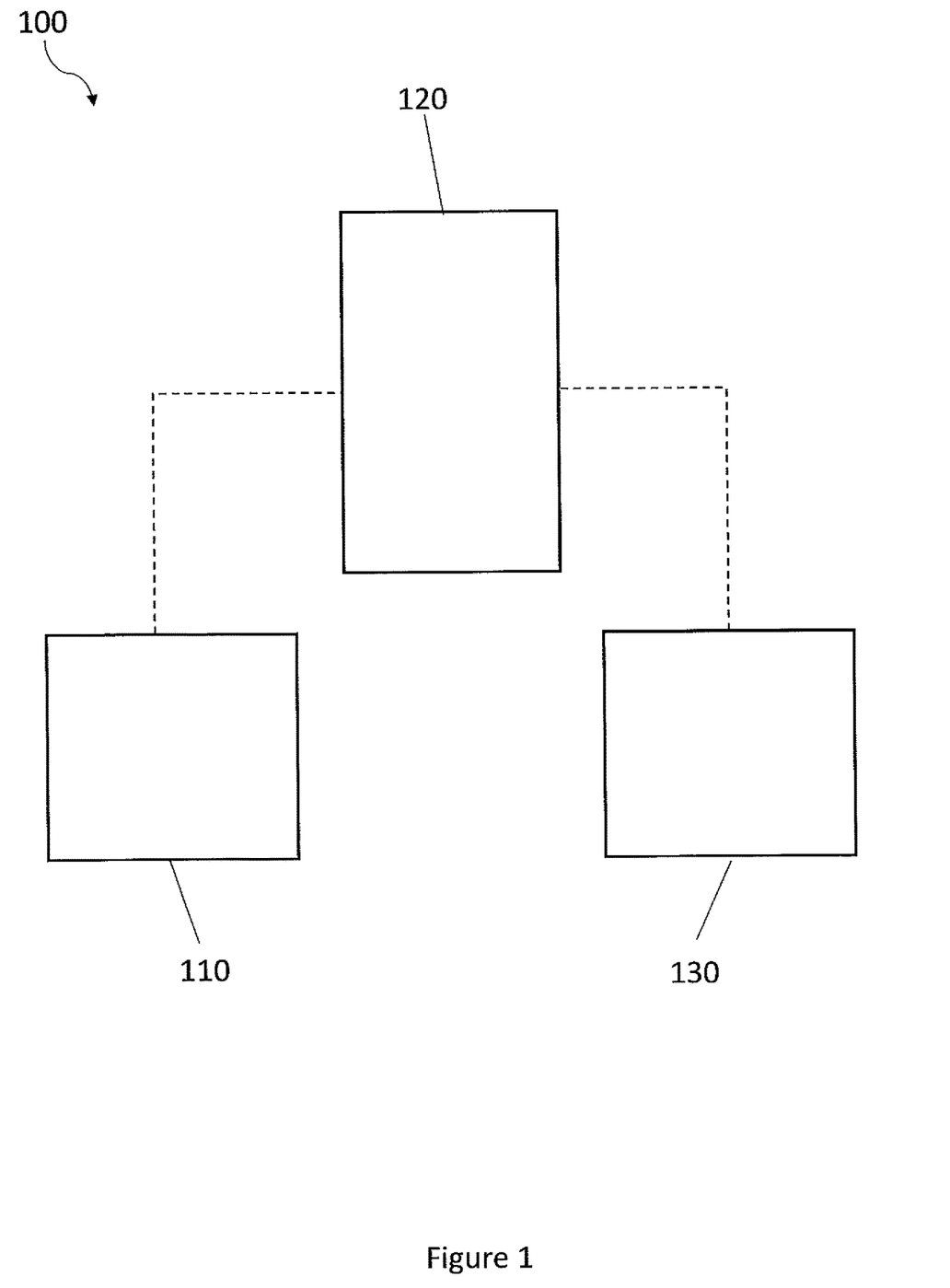
FIG. 1 is a system diagram in accordance with aspects described herein.

FIG. 1 shows a system 100 comprising a first computing device 110, a server 120 and a second user device 130. The first computing device is in data communication with the server 120, by an Internet connection (indicated with a dashed line). Similarly, the server 120 is in in data communication with the second user device 130, by an Internet connection (indicated with a dashed line).

The computing devices 110 and 130 comprise a processor, and a non-volatile memory (not shown). The processors may comprise one or more individual processor cores. The computing devices 110 and 130 further comprise a display and a user interface (not shown). The computing devices 110 and 130 may be a desktop computer, laptop or tablet device or smartphone or other computing device. In some examples, the display will be integrated into the computing devices 110 and 130. The user interface may be a keyboard and/or mouse arrangement, or may utilise a touch screen where appropriate.

The server 120 may be any device or computing device capable of communicating with, and establishing connections between, the first computing device 110 and the second computing device 130. The server 120 is required only to validate connections to the first and second computing devices and thereafter facilitate a peer-to-peer connection between the first computing device 110 and the second computing device 130. Therefore, the server 120 needs only limited computing resources compared to a traditional server-client hardware. In some embodiments, the server 120 may even be hosted by the first computing device 110, either by hardware partition or software simulation. The server 120 is a signalling server. As such, it does not provide heavy processing, storage or bandwidth capabilities.

The first computing device 110 is a host device. The host device 110 is the computing device which contains project data and from which the project data is shared. The second computing device 120 is a viewing device. The viewing device 120 is the computing device which receives the project data.

Figure 2:
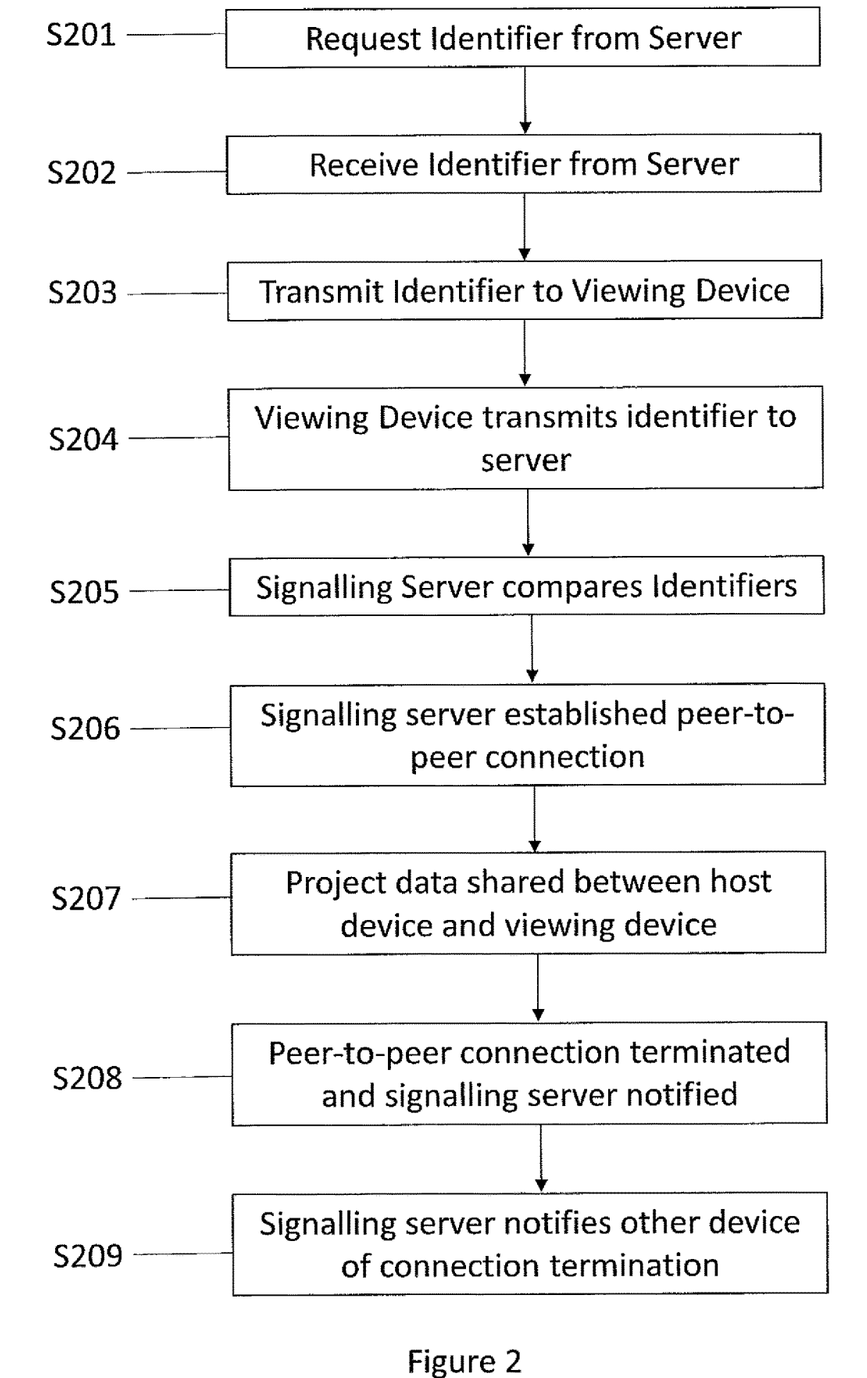
FIG. 2 is a flow chart illustrating a method in accordance with aspects described herein.

A method of sharing project data between the host device 110 and the viewing device 130 will be now described with reference to FIG. 2. FIG. 2 shows an illustrative method of sharing project data.

At step S201 the host device 110 contacts the signalling server 120 requesting an identifier. The identifier may be any data which can be generated by the signalling server 120 and sent over the Internet connection to the host device 110. The identifier is used by the signalling server 120 to identify the host device 110 and eventually to connect the viewing device 130 with the host device. When the host device 110 wishes to share more than one project, the identifier may identify both the host device and the particular project. In this case the identifier may be referred to as a project identifier. The identifier may simply be a randomly generated string of bits, such as "abc123".

At step S202, the host device 110 receives an identifier from the signalling server 120.

At step S203, the host device 110 transmits the identifier to the viewing device 130. At this point, no direct connection has been established between the host device 110 and the viewing device 130. The host device 110 may transmit the identifier to the viewing device 130 by any suitable communication channel, such as email, by use of an instant messaging application or social media.

The host device 110 may transmit only the identifier to the viewing device 130 at step S203. However to make the method simpler, the host device 110 preferably transmits a uniform resource locator (URL) comprising the identifier to the viewing device. The URL directs the viewing device to a web page hosted by the signalling server 120. An illustrative URL is "http://example.com/?id=abc123", where the web page "http://example.com" is hosted by the signalling server 120 and the identifier is "abc123".

As step S204, the viewing device 130 transmits the identifier to the signalling server 120. This viewing device 130 may transmit the identifier by any suitable method.

At step S205, the signalling server 120 compares the identifier received from the viewing device 130 to previously requested identifiers in order to match the host device 110 and the viewing device 130.

At step S206, the signalling server establishes a peer-to-peer connection between the host device 110 and the viewing device 130. Once the peer-to-peer connection has been established, no further data needs to be transferred by the signalling server 120, as the host device 110 and the viewing device 130 are directly connected by the peer-to-peer connection.

Suitable methods of establishing peer-to-peer connections are well known in the art, and are not the focus of the present patent application. Such methods of establishing peer-to-peer connections involve industry-standard processes which involve identifying local and public connectivity information (such as using a STUN (Session Traversal of User Datagram Protocol Through Network Address Translators) server) including how to traverse the network configuration (such as if network address translation is in use), swapping connectivity information through the signalling server, and then using the received connectivity information to establish the peer-to-peer connection. The peer-to-peer connection may be established across a LAN if local connectivity can be established, which usually provides a better quality connection. However, if it cannot, it will connect over the Internet.

At step S207, the host device 110 shares the project content with the viewing device 130 over the peer-to-peer connection. The project content may include image files, audio files, video files, and executable logic for running a project application (such as scripts and data).

Now the peer-to-peer connection has been established, and the project content shared with the viewing device 130, data related to the project application running on the viewing device 130 and/or the host device 110 can be shared back and forth between the host device 110 and the viewing device 130. This data may comprise performance data relating to the project content (such as the framerate (FPS) and CPU/GPU utilisation), software and hardware information (such as their operating system or GPU model of the viewing device), a real-time video stream of what the viewing device is displaying, the actions being input into the viewing device, and so on. The sharing of this kind of information is useful in testing the project content.

The peer-to-peer connection is real-time and full-duplex. This allows for the real-time exchange of the information discussed above. Sending data over a peer-to-peer connection saves the service provider from having to be responsible for transferring it, which simplifies and lowers the cost of running the service. Furthermore, peer-to-peer connections provide a more efficient and lower-latency service compared to the traditional approach to sharing project data; i.e., the use of an HTTP server, which typically only supports a one-way request-response pattern. Peer-to-peer connections also support transmission of real-time media such as a video stream of what a user of the viewing device is seeing and doing. This real-time media can then be cross-referenced with the performance and technical data to gain new insights to the development of the project application, ultimately improving the project outcome. For example, it may be identified that a particular part of the project application has a low frame rate for a remote user with a particular model of phone.

After a period of time, one of the host device 110 and/or the viewing device 130 may wish to terminate the peer-to-peer connection. This termination may be done by any known method of terminating a peer-to-peer connection. The device which has not terminated the connection will eventually realise the connection has been terminated when no further data is received and/or upon receiving a time-out notification or an undelivered notification. However, preferably, the signalling server S120 can further serve to notify the or each connected device that the peer-to-peer connection has been terminated.

At step S208, the host device 110 decides to terminate the peer-to-peer connection. At the same time, the host device 110 sends a message to the signalling server 120 indicating that the peer-to-peer connection has been terminated.

Finally, at step S209, the signalling server 120 notifies the viewing device 130 that the peer-to-peer connection has been terminated.

The above embodiment has been described with reference to a peer-to-peer connection made between a host device and a single viewing device. However, this method is equally applicable to setting up multiple peer-to-peer connections. One of the advantages described herein is that the signalling server need only have sufficient resources to enable the signalling required to establish each peer-to-peer connection. By contrast, the resources needed by a traditional "server hosted" project sharing system multiply with each additional viewing device which connects. Therefore, aspects described herein are applicable, and particularly advantageous, when a host device wishes to share a project with multiple viewing devices.

To aid the skilled person's understanding, in the above embodiment the host device 110 and the signalling server 120 have been described as separate devices connected by an internet connection. However, the host device 110 may have the capability to perform the functions of the signalling server. In this case, a separate signalling server 120 is not required, and the host device 110 may perform all of the functions of the signalling server 120 described above.

One advantage described herein is that project data may be shared globally over the Internet, rather than in a local scope where direct wired connections are required. This makes it easier to do broad testing of project applications with a variety of testers and hardware devices from around the world. A further advantage of some aspects is that it enables the host device to receive real-time technical information from the viewing device, as well as other real-time streams like video. This real-time information can be used to improve the project application. Furthermore, aspects described herein provide a convenient method for a host device to share project content and for viewing devices to receive and access the project content, especially if the URL mechanism is used. Additionally, aspects described herein enable the host device to share project data via existing communications channels such as social media and instant messaging, improving the ability for the host device to distribute project content across a wide audience.

Aspects described herein may be implemented in software. In particular, they may be implemented in a software application which does not have the necessary permission or the necessary capability to host a server. An example of such a software application is a web browser application, such as MICROSOFT INTERNET EXPLORER. Such a software implemented embodiment will now be described by reference to FIG. 3.

Figure 3:
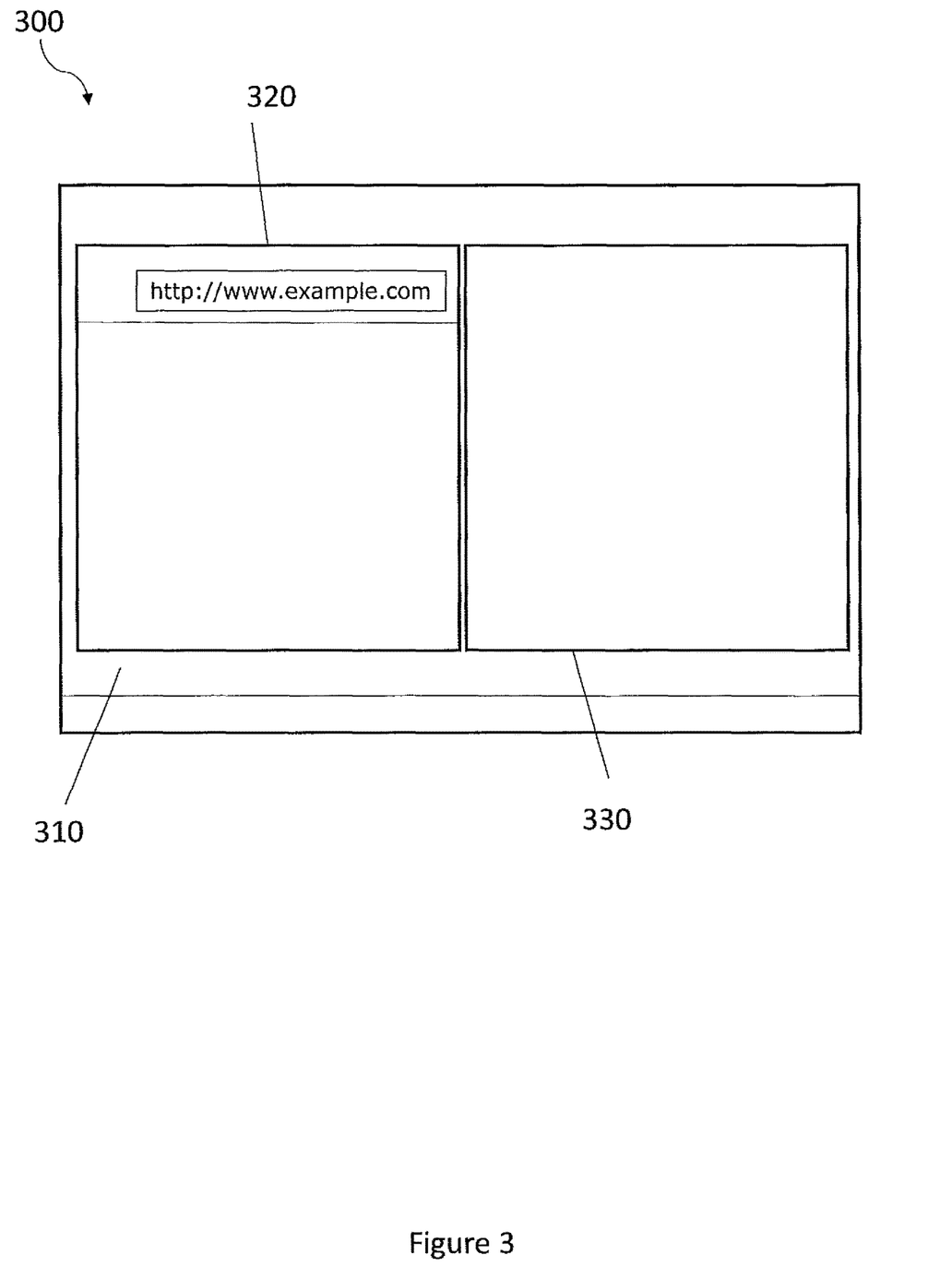
FIG. 3 is a diagram showing a graphical user interface in accordance with aspects described herein.

FIG. 3 shows a graphical user interface 300 of a host device. The graphical user interface is a visual representation of an operating system, such as MICROSOFT WINDOWS and any applications running on the operating system. In FIG. 3, the graphical user interface 300 is displaying the operating system 310, a web browser window 320 (such as MICROSOFT INTERNET EXPLORER) and a project development application 330 (such as CONSTRUCT 2 by Scirra Limited, ADOBE PHOTOSHOP or AUTODESK). A project development application is any application which allows a user to develop a computer executable project application such as a computer game, a photo/video project or a Computer Aided Design model.

For the following explanation, the project development application will be considered to be a computer game development application such as CONSTRUCT 2. Consequently, the project content will comprise the computer executable code, audio files, graphics files and any further data needed to provide a playable computer game.

Figure 4:
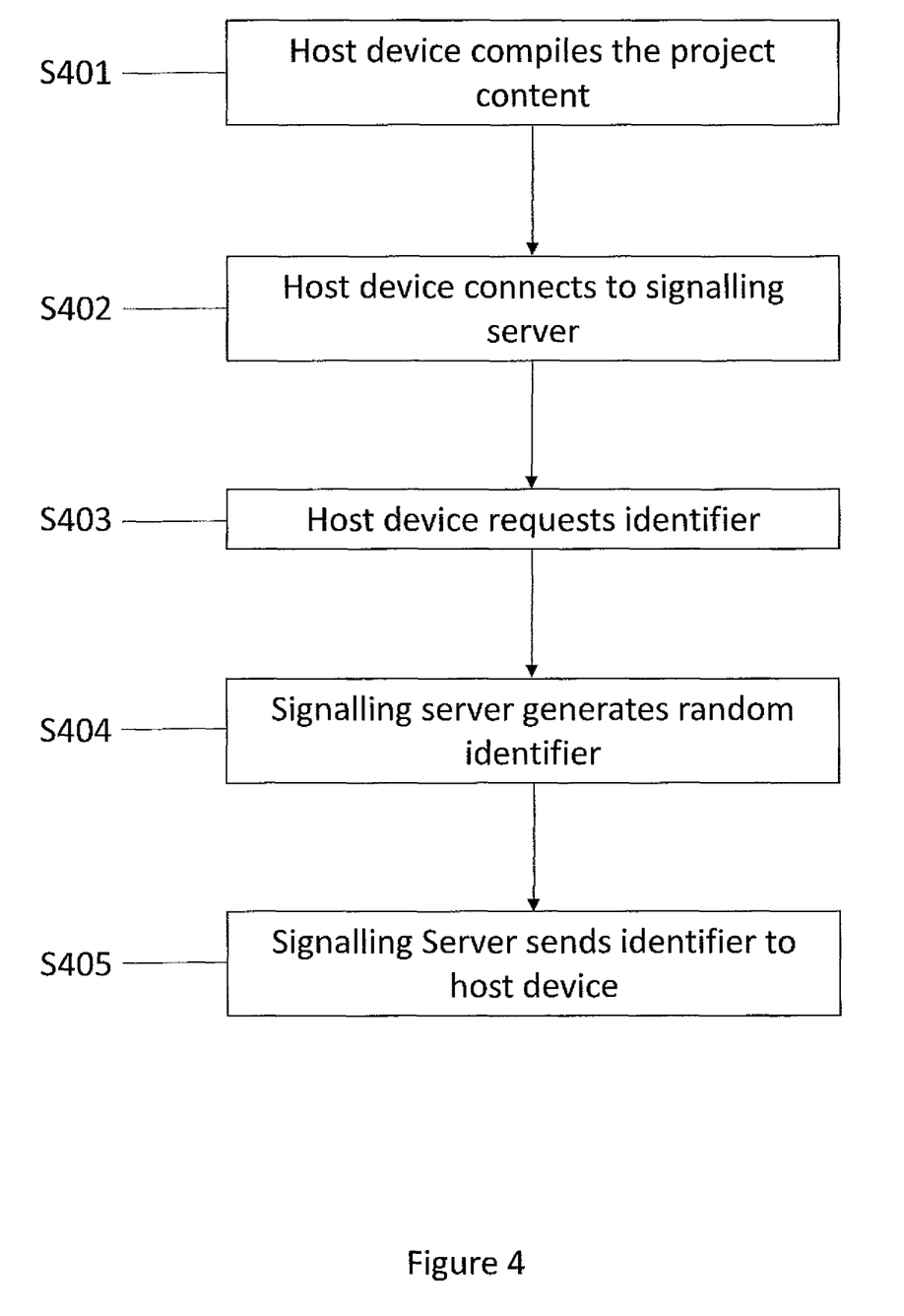
FIG. 4 is a flow chart illustrating a method in accordance with aspects described herein.
Figure 5:
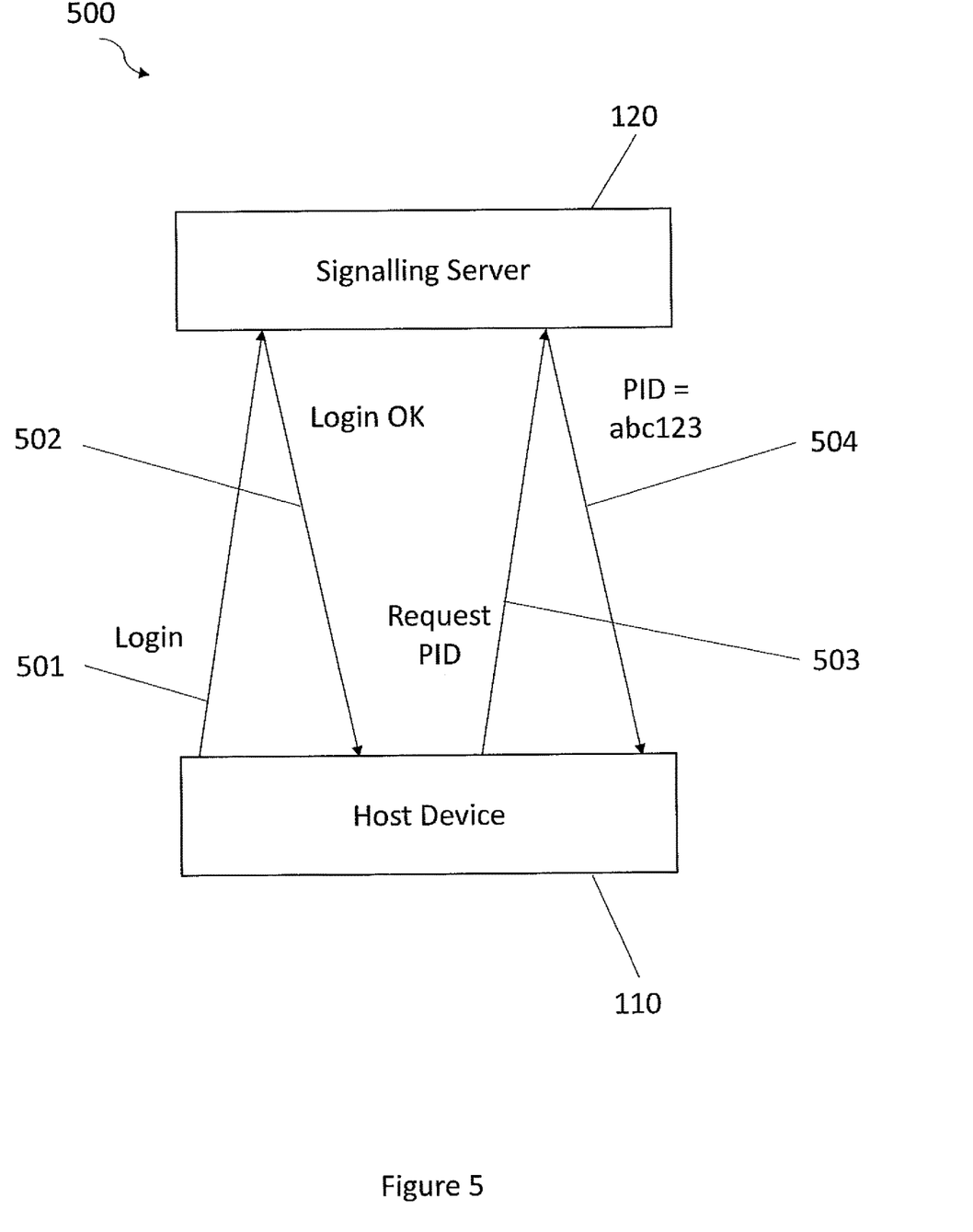
FIG. 5 is a system diagram in accordance with aspects described herein.
Figure 6:
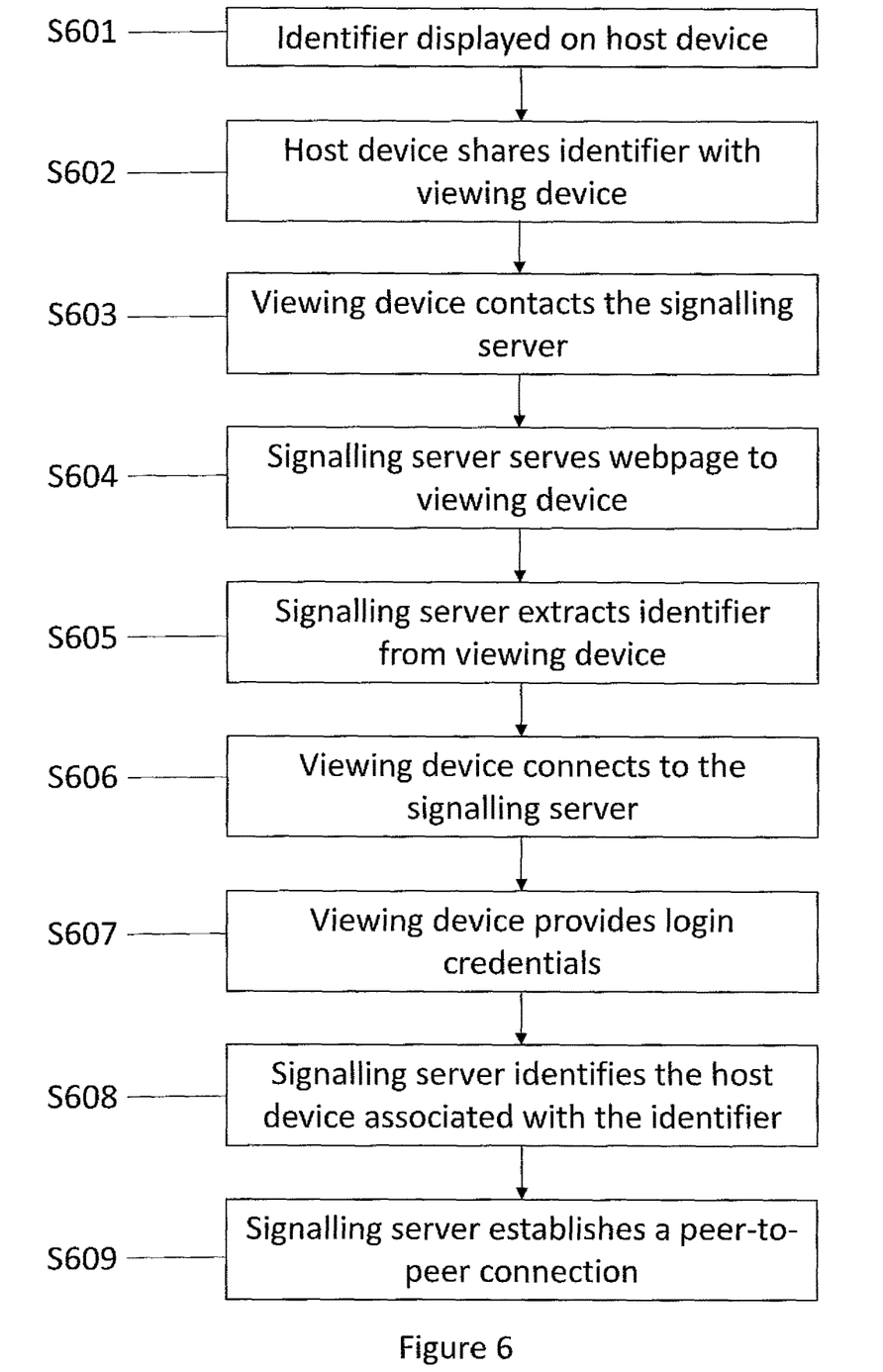
FIG. 6 is a flow chart illustrating a method in accordance with aspects described herein.
Figure 7:
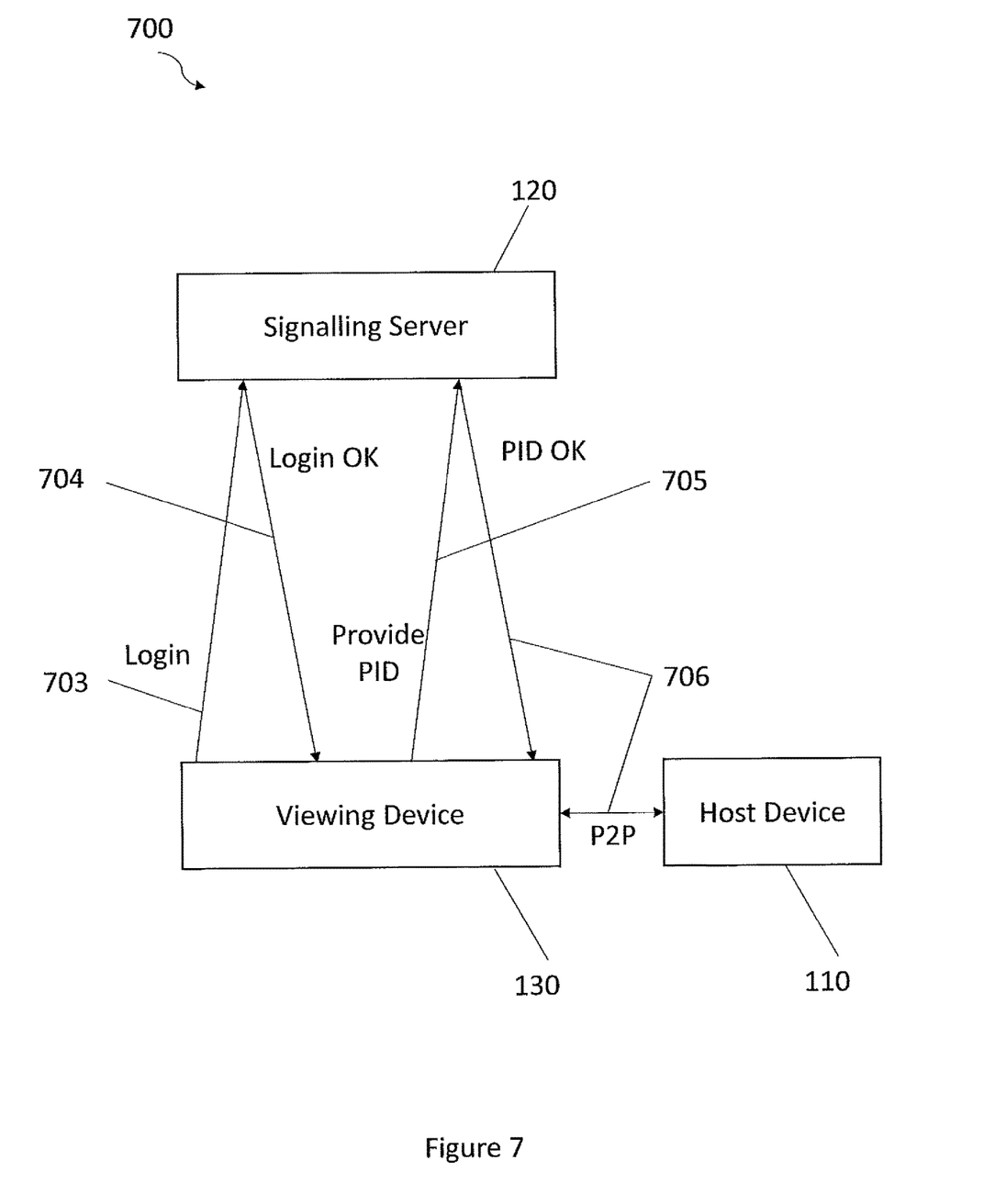
FIG. 7 is a system diagram in accordance with aspects described herein.
Figure 8:
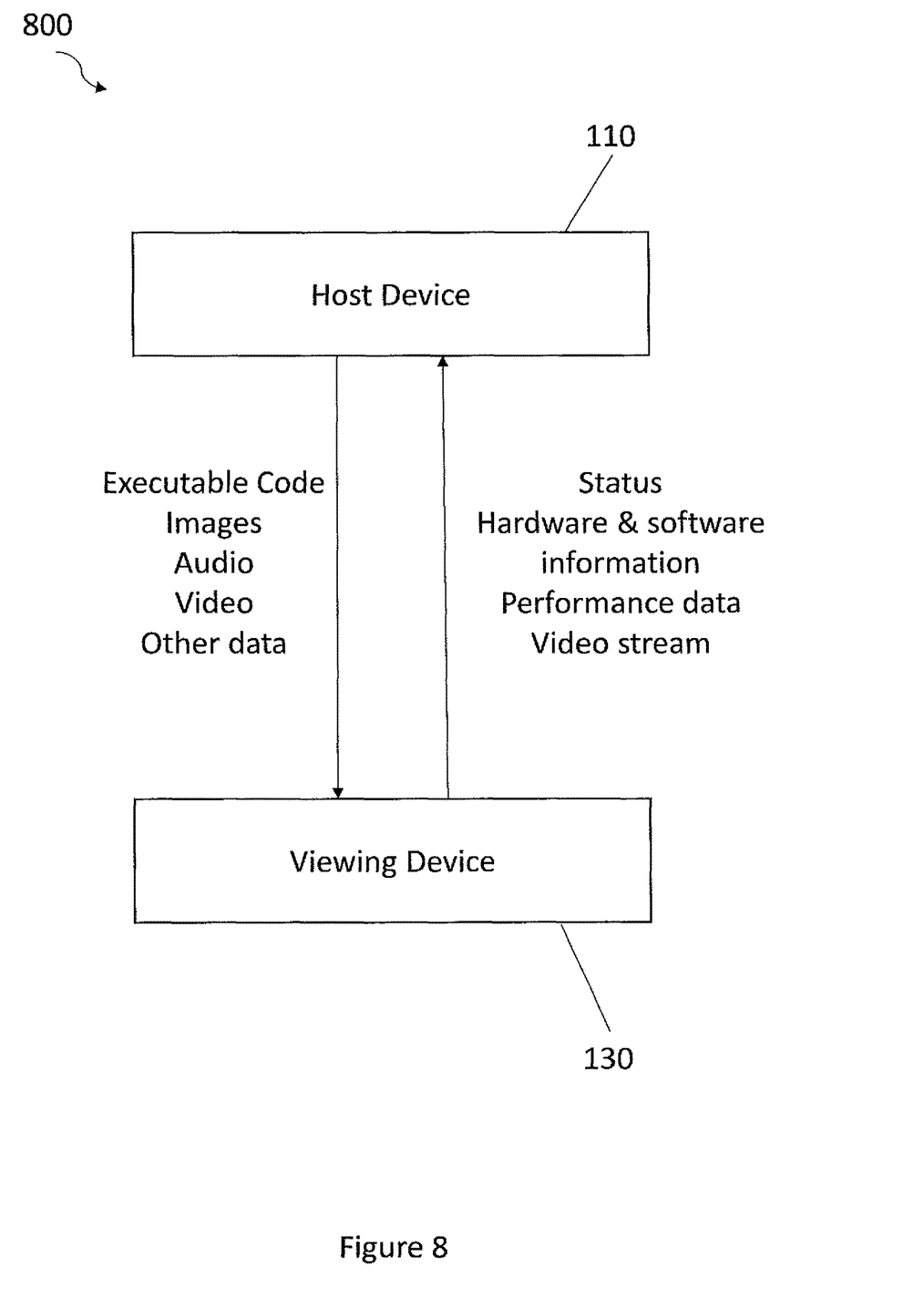
FIG. 8 is a system diagram in accordance with aspects described herein.

A method of sharing project data between a host device 110 and a viewing device 130 will be now described with reference to FIGS. 3 to 8. FIGS. 4 and 5 illustrate a method of connecting a host device 110 to a signalling server 120. FIGS. 6 and 7 illustrate a subsequent method of connecting a device 130 to the signalling server 120, and a peer-to-peer connection being established between the viewing device 130 and the host device 110. FIG. 8 illustrates the subsequent sharing of project data between the viewing device 130 and the host device 110 over the established peer-to-peer connection.

FIG. 4 is a flow chart illustrating a method of a host device 110 requesting an identifier from a signalling server 120. Either before or during initiation of project sharing, the host device's project development application 330 may need to compile (S401) the project contents as it would for a normal preview, so that all of the resources necessary to view the project content are available.

At step S402, the host device 110 connects to a signalling server 120. The signalling server 120 is a centrally hosted server. For the initial connection, the host device 110 may have to be directed by a user to contact the signalling server. For example, the user may use the web browser window 310 to find and load a website run by the signalling server 120. Alternatively, the signalling server's IP address may be pre-loaded into the project development application 330.

The host device 110 may automatically log in to the signalling server 120 if no user credentials are required, or if the correct user credentials are supplied to the signalling server 120 during initial connection. Alternatively, the host device 110 may be prompted by the signalling server 120 to provide login credentials such as a username and password. In this case, a user of the host device 110 may have to provide the correct user credentials. The user may be prompted to enter these user credentials into the web browser window 320 or the project development application 330, depending on the method of connection. The signalling server 120 will respond to indicate if the login was successful.

Once logged in, at step S403, the host device 110 requests an identifier from the signalling server 120. The identifier may be any data which can be generated by the signalling server 120 and sent over an Internet connection to the host device. The identifier is user by the signalling server to identify the host device and eventually to connect the viewing device with the host device. Where the host device wishes to share more than one project, the identifier may identify both the host device and the particular project. In this case the identifier may be referred to as a project identifier (hereinafter a "PID"). The identifier may simply be a randomly generated string of bits, such as "abc123".

The request sent at S403 may also include a password which the host device 110 wishes to be associated with the requested identifier. The password enables the signalling server 120 to identify viewing devices 130 with permission to connect to the host device 110.

At step S404, the signalling server 120 generates a random PID. The PID should be hard to guess, since this can act as a basic way to prevent unintended viewers being able to view the project. The PID should be unrelated to information provided by the host device. At step S405, the signalling server 120 sends the PID to the host device, and stores an association between the host device and the PID. Preferably, the host device remains connected to the signalling server to enable quicker subsequent connection to one or more viewing devices 130. After this point the host device waits for a viewing device to connect.

FIG. 5 illustrates this process of requesting a PID as set out in connection with FIG. 4. FIG. 5 shows a host device 110 and a signalling server 120 and illustrates the method steps S401, S402, S403 and S405 with arrows labelled as 501, 502, 503 and 504 respectively.

FIG. 6 is a flow chart illustrating connection of the viewing device 130 to the signalling server 120, and establishment of a peer-to-peer connection. At step S601, the project development application 330 of the host device 110 will display the PID to a user. This enables the user to share the PID with one or more persons wishing to view the project content. Preferably, the project development application 330 will embed the PID in a URL, such as http://example.com/?id=abc123, since this can easily be shared by the user. Any viewed who receives the PID in URL form will simply have to visit the URL in a web browser application to commence project sharing.

At step S602, the host device 110 sends the URL or the PID to a viewing device through an existing communication channel, such as email, instant messaging or social media.

At step S603, a viewing device 130 contacts the signalling server 120 through accessing the URL in a web browser application on the viewing device. In response, at step S604, the signalling server 120 responds by serving a minimal web page to the viewing device 130.

As step S605, the signalling server 120 extracts the PID from the URL. If the PID is not present, or is incorrect, the signalling server 120 may prompt the viewing device 130 to enter a PID and the method moves to step S607. Otherwise, if the PID is correct, at step S606 the viewing device 130 connects to the signalling server 120. As with the host device 110, the viewing device 130 may automatically log in, or may have to provide login credentials such as a username and password (the password here is for the viewing device's login, rather than the one associated with the PID).

At step S607, the viewing device 130 sends the PID to the signalling server 120, and optionally a password for accessing the PID. If the PID is not recognised or the password is incorrect, the signalling server 120 responds with an error. Otherwise, at step S608, the signalling server 120 identifies the host device 110 that is associated with the PID. Subsequently, at step S609, the signalling server 120 confirms to the viewing device 130 that the connection is valid and then establishes a peer-to-peer connection between the viewing device 130 and the host device 110.

FIG. 7 illustrates this process of connecting a viewing device 130 to the signalling server 120 and establishing a peer-to-peer connection, as set out in connection with FIG. 6. FIG. 7 shows a viewing device 130, a signalling server 120 and a host device 110. FIG. 7 illustrates the method steps S603, S604, S606 and S607 with arrows labelled as 703, 704, 705 and 706 respectively.

Rather than using an URL in a web browser application, it is possible that this process can be initiated in other ways. For example, the viewing device 130 could download and install a separate piece of software that the PID may be entered into. However, using a web browser application interface is simply the most convenient way for a user to initiate this process.

Once the peer-to-peer connection has been established, the signalling server 120 may no longer be involved in the connection. The viewing device 130 can now disconnect from the signalling server 120. Optionally, the host device 110 may remain connected to the signalling server so additional peer-to-peer connections can be established with further viewing devices.

Once the or each peer-to-peer connection has been established, the host device 110 immediately sends the project content to the viewing device 130. In this example, the host device 110 sends to the viewing device 130 all of the resources necessary to run the computer game development application that the host device is working on. This may include data such as images, audio and video, but also includes all the executable code or scripts that are necessary for the viewing device 130 to run the computer game. As soon the viewing device 130 has received all of the resources, the viewing device may start running the computer game. This may involve compiling and executing the transmitted executable code of the viewing device 130.

Whilst the viewing device 130 is compiling and executing the transmitted executable code, and during subsequent running of the computer game, the viewing device 130 sends technical information to the host device 110. This technical information is related to the performance of the viewing device 130 and/or the computer game. This technical information may therefore include the status of the game (loading or running), software and/or hardware information, performance details such as framerate and CPU/GPU usage, and so on. This exchange of information between the host device 110 and the viewing device 130 is illustrated in FIG. 8.

FIG. 8 illustrates a host device 110 and a viewing device 130 have a peer-to-peer connection established therebetween. FIG. 8 illustrates the host device 110 sending executable code, images, audio, video and/or other data to the viewing device 130. Additionally, FIG. 8 illustrates the viewing device 130 sending status information, hardware and software information, performance data and/or a video stream to the host device 110.

Any and/or all of the information shared between the host device 110 and the viewing device 130 may be shared in a real-time data stream. Real-time streams of the activity of the viewing device enables the host device to observe the testing of the game in real-time. This may provide useful insights in to how to improve and or amend the project content data. The real-time stream(s) may be sent by default, but preferably will only be sent when requested by the host device 110. This saves bandwidth if a real-time stream is not required by the host device 110. In the case the host device 110 requests one or more real-time streams, the host device 110 will send a message to the viewing device 130 requesting the real-time stream(s). In response, the viewing device 130 will send the requested real-time streams(s) to the host device 110.

The host device's project development application 330 can maintain and display a list of all connected viewing devices 130. This list will show the hardware and software information, as well as real-time information like the performance data of each connected viewing device 130. This enables the user of the host device 110 to review technical aspects of the game without having to request the technical information from each viewing device 130. The project development application 330 may also display a button or link to activate the process of requesting a real-time data stream. When a real-time data stream such as a video stream is available, the project development application 330 will preferably provide a separate window (not shown) in the operating system 310. This separate window comprises a label identifying which viewing device can provide the stream, and a render of the provided stream.

In addition to the above described information which may be shared between the host device 110 and the viewing device 130, both devices may send notifications over the peer-to-peer connection. These notifications are used to indicate important events to the other device. These important events may include one or more of the following:

Either of the host device 110 and/or viewing device 130 disconnecting from the peer-to-peer connection and becoming unavailable. When a viewing device 130 disconnects, the host device 110 should remove the viewing device 130 from the list of connected viewing devices. When the host device 110 disconnects, the viewing device should display a visual indication, because although they may continue to run the game, their PID will no longer work;

The viewing device 130 notifies the host device 110 when it has finished loading and started running the project content application;

The viewing device 130 displays a visual indication when the host device requests a real-time stream, so a user of the viewing device knows their activities may now be being observed;

The viewing device 130 notifies the host device 110 if the computer game running on the viewing device 130 is paused or otherwise become idle; and The host device 110 notifies the viewing device 130 when an updated version of the project content is available.

The host device 110 may also send one or more commands to the viewing device 130 over the peer-to-peer connection. These commands enable the host device 110 to control the execution of the game, facilitate testing and/or run diagnostics. These commands may include one or more of the following:

A command to pause the game and inspect the execution or performance state of the viewing device 130. This provides similar functionality to that of a remote debugger;

A command to change which section or level of the computer game is running on the viewing device 130.

A command to forcibly terminate the computer game and/or the viewing device's connection;

A command to change settings in the computer game to test their effect on the execution of the computer game; and Sending remote inputs to control the game on the viewing device 130 from the host device 110.

As discussed briefly above, both the host device 110 and/or the viewing device 130 may update or amend the project contents and make the new version of the project content available. This is part of the project contents test-and-develop iteration cycle. At this point, the host device 110 has already sent a copy of the older project content to any connected viewing devices 130. Therefore, the viewing devices may keep the old version of the project content running.

Figure 9:
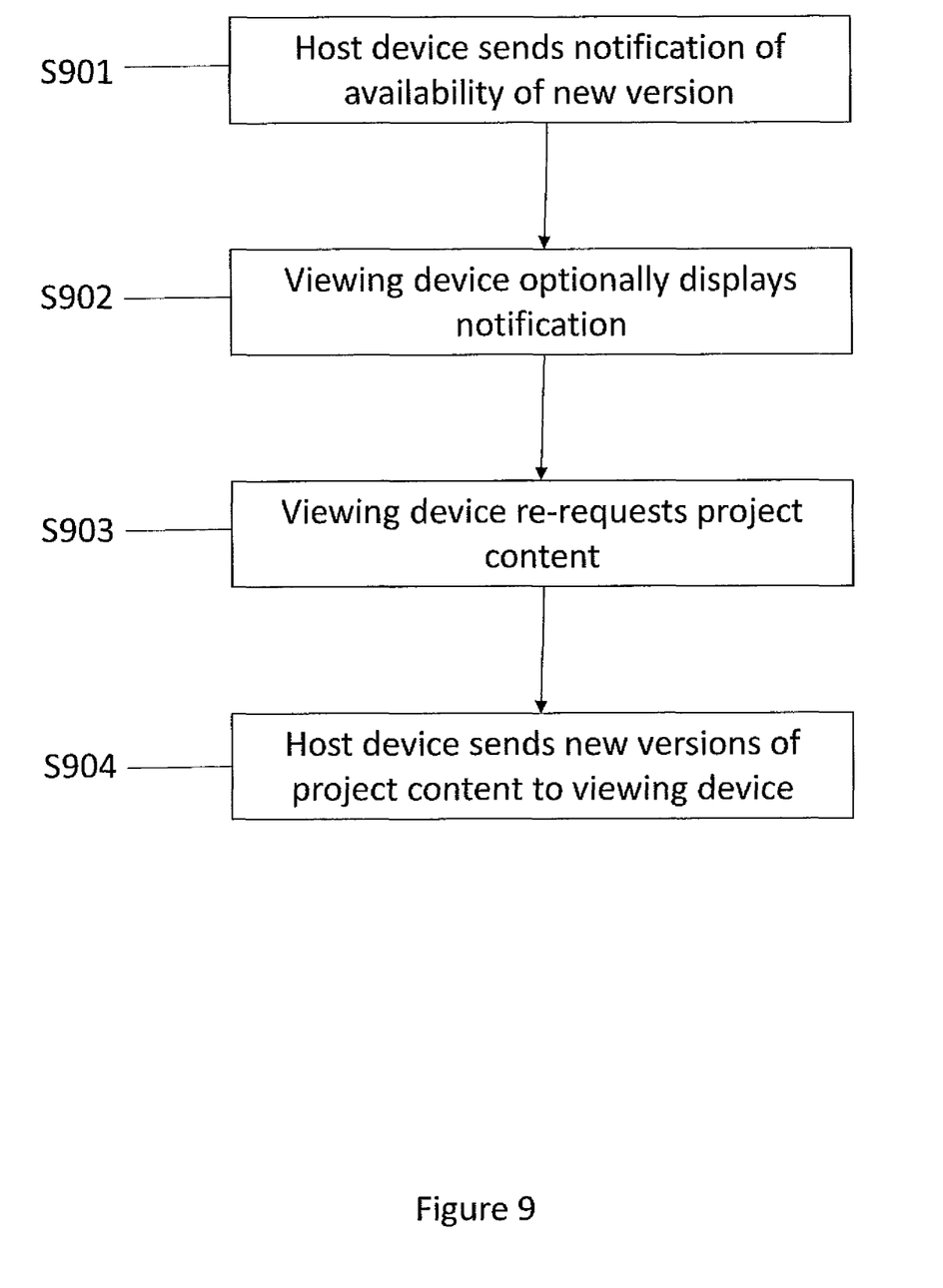
FIG. 9 is a flow chart illustrating a method in accordance with aspects described herein.

An illustrative method of propagating an updated version of the project content will now be described with reference to FIG. 9. FIG. 9 illustrates this method in a flow chart.

To propagate the new version of the project content, the host device 110 sends, at step S901, a notification indicating the availability of a new version of the project content to each connected viewing device 130 over the peer-to-peer connection. The viewing devices 130 may respond to this notification by either displaying a visual notification (S902), or by immediately loading the new version of the project content (by following method steps S903 to S904 described below). Preferably a visual notification is used to avoid interrupting any active viewing devices 130.

The signalling server 120 does not have to be involved when new project content is made available. The host device 110 can use the existing peer-to-peer connection to each viewing device 130 to notify the viewing devices of the update. The host device 110 may need to perform the same steps as before to compile or otherwise prepare the new version of the project data prior to sharing it.

Once the project content is ready and the viewing devices have received a notification that it is available, the viewing device will need to re-request (S903) the project content. The viewing devices 130 may do this by discarding all received project content, and sending a request to the host device 110 to re-send the project content, then repeating the steps to receive and load the project content.

Alternatively, in the context of a web page running on a web browser application, a viewing device 130 may re-request (S903) the project content by re-loading the web page provided by the server 120. In this case, the viewing device 130 goes through the process described by reference to FIGS. 6 and 7 again, as if the viewing device 130 were a new viewing device. This repeated process may require the use of the signalling server 120 again, however the identifier may be re-used, simplifying the method of re-connection.

Once the viewing device 130 has re-requested the project content, the host device 110 sends (S904) the latest version of the project content over the peer-to-peer connection. This results in the viewing device 130 being able to load and run the latest version of the project content. This process allows the host device 110 and a remote viewing device 130 to collaborate on changes to the project content. For example, the viewing device 130 can ask the host device 110 to edit the project content, which the host device 110 subsequently enacts. The above defined process can then be repeated, and the latest version of the project content shared with the viewing device 130. Alternatively, if the viewing device 130 has the capability to edit the project content, the viewing device 130 may locally correct the project content. This corrected project content can be sent to the host device 110, by the same above described notification process, and then reviewed by the host device 110.

Further changes, or requests to change the project content, may then be issued, and the process can repeat. This method advantageously enables convenient, rapid, iterations to project content with a remote tester.

Figure 10:
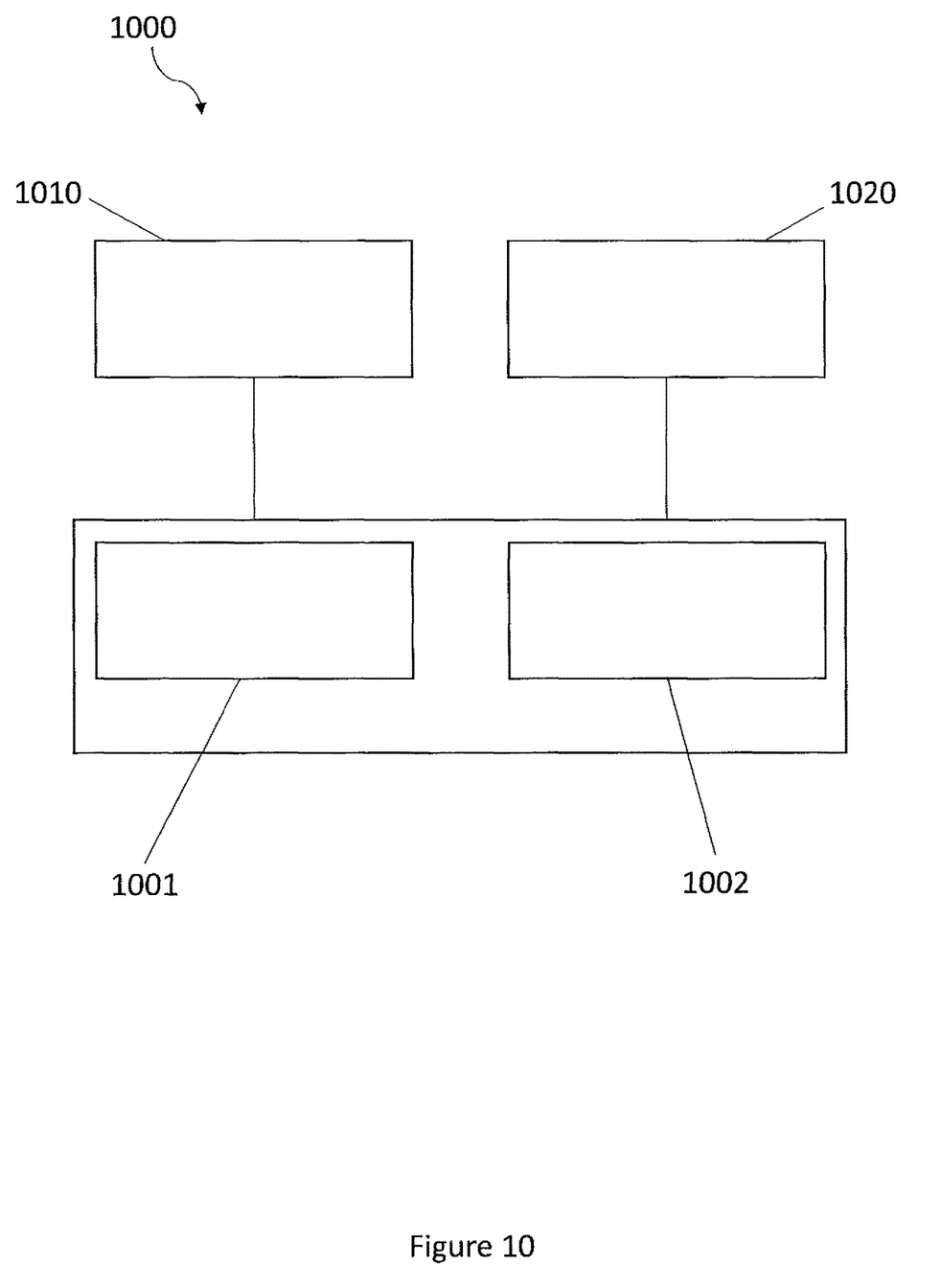
FIG. 10 is a system diagram in accordance with aspects described herein.

FIG. 10 shows a computing device 1000 according to an illustrative embodiment. The computing device 1000 may be either a host device 110 or a viewing device 130. The computing device 1000 comprises a processor 1001, and a non-volatile memory 1002. Processor 1001 may comprise one or more individual processor cores. The computing device 1000 further comprises a display 1010 and a user interface 1020. The computing device 1000 may be a desktop computer, laptop or tablet device or smartphone or other computing device. In some examples the display 1010 will be integrated into the computing device 1000. The user interface 1020 may be a keyboard and/or mouse arrangement, or may utilise a touch screen where appropriate. The computing device 1000 also comprises an operating system (not shown). The methods described herein may run on the operating system (not shown) of computing device 1000.

To summarise, aspects described herein make it easy for users using computer application development software to share their project over the Internet and gather feedback, with minimal hosting costs for the service provider. The process is designed to be easy enough to conveniently share projects over channels like email, instant messaging, and social media.

The above embodiments describe illustrative ways to implement the described features and aspects. It will be appreciated that modifications of the features of the above embodiments are possible within the scope of the appended claims. For example, the methods described herein may be applied to any kind of window. The features of the browser windows and web windows described herein are for example only and should not be seen as limiting to the claims.

In the above-described embodiments, a system has been described in the context of sharing projects. While project sharing is a term of art familiar to those in the art of software development, it will be understood that the above-described system and methods are for sharing and testing software applications. In this regard, the project may be regarded as the application project resources. Application project resources may include one or more executable files for running an application, as well as image, audio and video files. As such, it will be understood that application project resources may otherwise be referred to as a project.

While particular combinations of features have been presented, it will be appreciated that other combinations, such as those provided above, may also or alternatively be used.

The invention claimed is:

1. A method of testing an application, comprising:
   establishing, from a host device, utilizing a signaling server, a peer-to-peer connection with a viewer device in a communications network, wherein the host device is a computing device which contains application project resources to be shared, and wherein the signaling server is used only to establish the peer-to-peer connection by:
      the host device obtaining an identifier from the signalling server,
      the host device communicating the identifier to the viewer device,
      the viewer device transmitting the identifier to the signalling server, and
      establishing the peer-to-peer connection between the host device and the viewer device in response to the signalling server receiving the identifier from the viewer device;
   transmitting via the peer-to-peer connection, from the host device, the application project resources to the viewer device to enable testing of the application at the viewer device, the testing being performed by a user of the viewer device, wherein the application project resources comprise one or more executable files arranged to be loaded and executed by the viewer device such that the viewer device can run and test the application using the one or more executable files, and wherein testing comprises amending the contents of the application project resources by the viewer device and making a new version of the application project resources available to the host device; and
   receiving, at the host device, data relating to the testing of the application;
   wherein the host device is arranged to run a web browser application and the peer-to-peer connection is established between the web browser application running on the host device and a web browser application running on the viewer device.

2. The method of claim 1, wherein obtaining the identifier is initiated within a web browser application running on the host device.

3. The method of claim 1, wherein communicating the identifier comprises:
   transmitting a uniform resource locator (URL) to the viewer device over a channel that does not include the signalling server.

4. The method of claim 3, wherein the URL comprises the identifier.

5. The method of claim 1, wherein the data relating to the testing of the application comprises data relating to the performance of the application running on the viewer device.

6. The method of claim 5, wherein the data relating to the performance of the application comprises one or more of: viewer device performance data, application performance data, software data, and hardware data.

7. The method of claim 1, wherein the data relating to the testing of the application comprises video and/or audio data captured at the viewer device.

8. The method of claim 1, wherein the application project resources enable the viewer device to install and run the application.

9. The method of claim 1, wherein the application project resources further comprise one or more of computer logic, image files, audio files and video files.

10. A method of testing an application, comprising:
    establishing, at a viewer device, a peer-to-peer connection with a host device by:
       receiving, at the viewer device, an identifier, transmitting, from the viewer device, the identifier to a signalling server, and establishing the peer-to-peer connection with the host device in response to the signalling server receiving the identifier, wherein the host device is a computing device which contains application project resources to be shared, wherein the signalling server is used only to establish the peer-to-peer connection;
    receiving, at the viewer device, the application project resources from the host device via the peer-to-peer connection, wherein the application project resources comprise one or more executable files arranged to be loaded and executed by the viewer device such that the viewer device can run and test the application; and
    loading, at the viewer device, the application using the application project resources to enable testing of the application at the viewer device using the one or more executable files, the testing being performed by a user of the viewer device, and wherein testing comprises amending the contents of the application project resources by the viewer device and making a new version of the application project resources available to the host device;
    wherein the host device is arranged to run a web browser application and the peer-to-peer connection is established between the web browser application running on the host device and a web browser application running on the viewer device.

11. The method of claim 10, wherein the identifier is transmitted to the signalling server through a web browser application running on the viewer device.

12. A host device for testing applications, wherein the host device is a computing device which contains application project resources to be shared, the host device comprising a processor controlling operations of the host device, and memory storing computer readable instructions that, when executed by the processor, configure the host device to:
    establish peer-to-peer connections with viewer devices by:
       obtaining an identifier from a signalling server, communicating the identifier to a particular viewer device, and establish a peer-to-peer connection between the host device and the particular viewer device in response to the host device receiving confirmation from the signalling server that the particular viewer device has received the identifier, wherein the signalling server is used only to establish the peer-to-peer connection;
transmit application project resources to viewer devices in a communications network via the peer-to-peer connection to enable testing of applications at the viewer devices, wherein each application project resources comprise one or more executable files arranged to be loaded and executed by a corresponding viewer device such that the corresponding viewer device can run and test the application using the one or more executable files, the testing being performed by a user of the corresponding viewer device, and wherein testing comprises amending the contents of the application project resources by the corresponding viewer device and making a new version of the application project resources available to the host device; and
receive data relating to the testing of applications from viewer devices;
wherein the host device is arranged to run a web browser application and the peer-to-peer connection is established between the web browser application running on the host device and a web browser application running on the particular viewer device.

13. A viewer device for testing applications, the viewer device comprising a processor controlling operations of the viewer device, and memory storing computer readable instructions that, when executed by the processor, configure the viewer device to:
establish a peer-to-peer connection with a host device by:
receiving, at the viewer device, an identifier, transmitting, from the viewer device, the identifier to a signalling server, and establishing the peer-to-peer connection with the host device in response to the signalling server receiving the identifier, wherein the host device is a computing device which contains application project resources to be shared, and wherein the signaling server is used only to establish the peer-to-peer connection;
receive the application project resources from the host device via the peer-to-peer connection, wherein the application project resources comprise one or more executable files arranged to be loaded and executed by the viewer device such that the viewer device can run and test the application, the testing being performed by a user of the viewer device; and
load the application using the application project resources to enable testing of the application at the viewer device using the one or more executable files, wherein testing comprises amending the contents of the application project resources by the viewer device and making a new version of the application project resources available to the host device;
wherein the host device is arranged to run a web browser application and the peer-to-peer connection is established between the web browser application running on the host device and a web browser application running on the viewer device.

* * * * *